United States Patent
Kinoshita

(10) Patent No.: US 9,208,368 B2
(45) Date of Patent: Dec. 8, 2015

(54) RECORDING MEDIA PROCESSING DEVICE, CONTROL METHOD OF A RECORDING MEDIA PROCESSING DEVICE, AND STORAGE MEDIUM FOR RECOGNIZING MAGNETIC INK CHARACTERS

(71) Applicant: Seiko Epson Corporation, Tokyo (JP)

(72) Inventor: Yoshiaki Kinoshita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 251 days.

(21) Appl. No.: 13/918,237

(22) Filed: Jun. 14, 2013

(65) Prior Publication Data

US 2013/0336569 A1 Dec. 19, 2013

(30) Foreign Application Priority Data

Jun. 14, 2012 (JP) ................. 2012-134563

(51) Int. Cl.
*G06K 7/14* (2006.01)
*G06K 9/18* (2006.01)
*G06K 9/62* (2006.01)

(52) U.S. Cl.
CPC .............. *G06K 7/1404* (2013.01); *G06K 9/186* (2013.01); *G06K 9/6271* (2013.01)

(58) Field of Classification Search
None
See application file for complete search history.

(56) References Cited

FOREIGN PATENT DOCUMENTS

JP 09-311906 A 12/1997
JP 2004-206362 A 7/2004

*Primary Examiner* — Nirav G Patel
(74) *Attorney, Agent, or Firm* — Nutter McClennen & Fish LLP

(57) ABSTRACT

The recognition rate is improved and recognition errors are suppressed when recognizing magnetic ink characters. A character recognition unit 80 calculates the difference between the reference waveform data of each character in a character set and the character waveform data of a read magnetic ink character 101, and defines the characters with the smallest differences to the read character as first and second candidate characters. If scaling the reference waveforms of the first and second candidate characters creates waveforms that are similar with a smaller difference therebetween than before scaling, and the ratio between the difference B between the waveform of the second candidate and the read character, and the difference A between the waveform of the first candidate and the read character, is greater than or equal to a specific value, the character recognition unit scales and adjusts the reference waveforms to recognize the magnetic ink character 101.

7 Claims, 9 Drawing Sheets

BOLD LINE: REFERENCE WAVEFORM DATA
THIN LINE: CHARACTER WAVEFORM DATA

RECORDING MEDIA PROCESSING DEVICE, CONTROL METHOD OF A RECORDING MEDIA PROCESSING DEVICE, AND STORAGE MEDIUM FOR RECOGNIZING MAGNETIC INK CHARACTERS

This application claims priority under 35 U.S.C. §119 to Japanese Patent Application No. 2012-134563 filed on Jun. 14, 2012, the entire disclosure of which is expressly incorporated by reference herein.

BACKGROUND

1. Technical Field

The present invention relates to a recording media processing device, a method of controlling a recording media processing device, and a storage medium.

2. Related Art

Recording media processing devices (check readers) that have a magnetic head for reading a magnetic ink character line (MICR line) recorded (printed) on checks and similar recording media, read the magnetic ink characters contained in the MICR line of the recording medium conveyed through a conveyance path, and recognize each magnetic ink character are known from the literature. See, for example, Japanese Unexamined Patent Appl. Pub. JP-A-2004-206362.

Such recording media processing devices identify (read) each character in the MICR line by magnetic ink character recognition, a process of extracting character waveform data in a range corresponding to one magnetic ink character from the signal waveform data obtained by reading the MICR line, and comparing the difference between the extracted character waveform data and reference waveform data defined by a particular standard for the characters to recognize each magnetic ink character, and repeating this process for each magnetic ink character in the line.

Due to deviation in the character width of printed magnetic ink characters, or variation in the pitch (conveyance distance) when conveying the recording medium through the recording media processing device, distortion (stretching and compression) can appear in the waveform of the acquired character waveform data compared with the reference waveform data. When this happens, the difference between the character waveform data and the reference waveform data increases, and the recognition rate decreases. Methods of stretching or compressing (scaling) part of the waveform of the reference waveform data to reduce the effect of stretching or compression of the character data waveform and enable magnetic ink character recognition are known from the literature. Depending on the magnetic ink character font, however, scaling can result in the waveform resembling the waveform of a different character, and scaling the waveform of the reference waveform data can therefore conversely result in recognition errors.

SUMMARY

The present invention is directed to solving at least part of the foregoing problem, and provides a recording media processing device, control method, and storage medium as described below.

A recording media processing device according to one aspect of the invention has a magnetic reading unit that magnetically reads a magnetic ink character recorded on a recording medium; and a character recognition unit that recognizes the read magnetic ink character based on comparing character waveform data acquired by the magnetic reading unit reading the magnetic ink character with reference waveform data for magnetic ink characters. The character recognition unit calculates a difference between the character waveform data and the reference waveform data for each magnetic ink character, defines the character with the smallest difference as the first candidate character of the read magnetic ink character, and defines the character with the next-smallest difference as the second candidate character of the read magnetic ink character. When the first candidate character and the second candidate character are characters with reference waveforms that when scaled are similar and have a smaller difference therebetween after scaling, and the ratio of the difference between the reference waveform data of the second candidate character and the character waveform data, to the difference between the reference waveform data of the first candidate character and the character waveform data, is greater than or equal to a specific value, the character recognition unit scales and adjusts the waveform of the reference waveform data for the first candidate character and the waveform of reference waveform data for the second candidate character, and recognizing the read magnetic ink character based on the difference between the reference waveform data of the adjusted candidate characters and the character waveform data.

When the character selected as the first candidate and the character selected as the second candidate based on the difference between the character waveform data acquired by reading a magnetic ink character and the reference waveform data for the magnetic ink characters are characters whose waveforms will resemble each other and have a smaller difference (difference between the reference waveform data of the first and second candidates) therebetween than before scaling if the waveforms of the reference waveform data are scaled, the reference waveforms may be mistakenly recognized for each other when the waveforms of the reference waveform data are scaled and compared.

If the candidate characters are characters with waveforms that resemble each other when the waveforms of the reference waveform data therefore are scaled, and the ratio of the difference between the reference waveform data of the second candidate character and the character waveform data, to the difference between the reference waveform data of the first candidate character and the character waveform data, is greater than or equal to a specific value, this embodiment of the invention scales and adjusts the waveform of the reference waveform data, and recognizes the read magnetic ink character based on the difference between the adjusted reference waveform data and the character waveform data. In other words, if the difference between the difference to the first candidate and the difference to the second candidate is great and the possibility of mistaking the first and second candidates for each other is small, the reference waveform data is scaled and adjusted, but the reference waveform data is not scaled and adjusted if the difference between the difference to the first candidate and the difference to the second candidate is small and the possibility of mistaking the first and second candidates for each other is high. Recognition errors can therefore be reduced and the recognition rate improved when the waveform of the acquired character waveform data is distorted (stretched or compressed).

In a recording media processing device according to another aspect of the invention, based the result of sliding and comparing the reference waveform data for the first candidate character, the reference waveform data for the second candidate character, and the waveform of the character waveform data, the character recognition unit determines if the first candidate character and the second candidate character are a character set with waveforms that will resemble each other and have a smaller difference therebetween than before scaling if the waveforms of the reference waveform data are scaled.

If the waveforms of the reference waveform data are scaled based on sliding and comparing the reference waveform data for the first candidate character, the reference waveform data for the second candidate character, and the waveform of the character waveform data, whether the candidate characters are a combination with waveforms that have a smaller difference therebetween than before scaling and are nearly identical can be detected. Because the decision is made based on the detected result, this embodiment can appropriately determine if the characters are a combination with similar waveforms after the waveforms of the reference waveform data are scaled.

In a recording media processing device according to another aspect of the invention, the character recognition unit preferably determines that the first candidate character and the second candidate character are a character set with waveforms that will be similar when the waveforms of the reference waveform data are scaled if the first candidate character and second candidate character are the number 2 and number 5, or the number 4 and transit symbol T.

If the waveforms of the number 2 and number 5, or number 4 and transit symbol T, are scaled, the differences between the resulting waveforms will be smaller than before scaling and the waveforms will resemble each other. Therefore, if the first and second candidate characters are either of these sets of characters, or a similar set of characters, the characters can be easily identified as a set of characters with waveforms that will be similar if the waveforms of the reference waveform data are scaled.

Another aspect of the invention is a control method of a recording media processing device having a magnetic reading unit that magnetically reads a magnetic ink character recorded on a recording medium, and a character recognition unit that recognizes the read magnetic ink character based on comparing character waveform data acquired by the magnetic reading unit reading the magnetic ink character with reference waveform data for magnetic ink characters, the control method comprising steps of: calculating a difference between the character waveform data and the reference waveform data for each magnetic ink character, defining the character with the smallest difference as the first candidate character of the read magnetic ink character, and defining the character with the next-smallest difference as the second candidate character of the read magnetic ink character; and scaling and adjusting the waveform of the reference waveform data for the first candidate character and the waveform of reference waveform data for the second candidate character, and recognizing the read magnetic ink character based on the difference between the reference waveform data of the adjusted candidate characters and the character waveform data, when the first candidate character and the second candidate character are characters with reference waveforms that when scaled are similar and have a smaller difference therebetween after scaling, and the ratio of the difference between the reference waveform data of the second candidate character and the character waveform data, to the difference between the reference waveform data of the first candidate character and the character waveform data, is greater than or equal to a specific value.

When the character selected as the first candidate and the character selected as the second candidate based on the difference between the character waveform data acquired by reading a magnetic ink character and the reference waveform data for the magnetic ink characters are characters whose waveforms will resemble each other and have a smaller difference (difference between the reference waveform data of the first and second candidates) therebetween than before scaling if the waveforms of the reference waveform data are scaled, the reference waveforms may be mistakenly recognized for each other when the waveforms of the reference waveform data are scaled and compared.

If the candidate characters are characters with waveforms that resemble each other when the waveforms of the reference waveform data therefore are scaled, and the ratio of the difference between the reference waveform data of the second candidate character and the character waveform data, to the difference between the reference waveform data of the first candidate character and the character waveform data, is greater than or equal to a specific value, this method of the invention scales and adjusts the waveform of the reference waveform data, and recognizes the read magnetic ink character based on the difference between the adjusted reference waveform data and the character waveform data. In other words, if the difference between the difference to the first candidate and the difference to the second candidate is great and the possibility of mistaking the first and second candidates for each other is small, the reference waveform data is scaled and adjusted, but the reference waveform data is not scaled and adjusted if the difference between the difference to the first candidate and the difference to the second candidate is small and the possibility of mistaking the first and second candidates for each other is high. Recognition errors can therefore be reduced and the recognition rate improved when the waveform of the acquired character waveform data is distorted (stretched or compressed).

Another aspect of the invention is a non-transitory storage medium storing a program executed by a control unit that controls parts of a recording media processing device having a magnetic reading unit that magnetically reads a magnetic ink character recorded on a recording medium, and a character recognition unit that recognizes the read magnetic ink character based on comparing character waveform data acquired by the magnetic reading unit reading the magnetic ink character with reference waveform data for magnetic ink characters, the program including steps of: calculating a difference between the character waveform data and the reference waveform data for each magnetic ink character, defining the character with the smallest difference as the first candidate character of the read magnetic ink character, and defining the character with the next-smallest difference as the second candidate character of the read magnetic ink character; and scaling and adjusting the waveform of the reference waveform data for the first candidate character and the waveform of reference waveform data for the second candidate character, and recognizing the read magnetic ink character based on the difference between the reference waveform data of the adjusted candidate characters and the character waveform data, when the first candidate character and the second candidate character are characters with reference waveforms that when scaled are similar and have a smaller difference therebetween after scaling, and the ratio of the difference between the reference waveform data of the second candidate character and the character waveform data, to the difference between the reference waveform data of the first candidate character and the character waveform data, is greater than or equal to a specific value.

When the character selected as the first candidate and the character selected as the second candidate based on the difference between the character waveform data acquired by reading a magnetic ink character and the reference waveform data for the magnetic ink characters are characters whose waveforms will resemble each other and have a smaller difference (difference between the reference waveform data of the first and second candidates) therebetween than before scaling if the waveforms of the reference waveform data are scaled, the reference waveforms may be mistakenly recognized for each other when the waveforms of the reference waveform data are scaled and compared.

If the candidate characters are characters with waveforms that resemble each other when the waveforms of the reference waveform data therefore are scaled, and the ratio of the difference between the reference waveform data of the second candidate character and the character waveform data, to the difference between the reference waveform data of the first candidate character and the character waveform data, is greater than or equal to a specific value, this program of the invention scales and adjusts the waveform of the reference waveform data, and recognizes the read magnetic ink character based on the difference between the adjusted reference waveform data and the character waveform data. In other words, if the difference between the difference to the first candidate and the difference to the second candidate is great and the possibility of mistaking the first and second candidates for each other is small, the reference waveform data is scaled and adjusted, but the reference waveform data is not scaled and adjusted if the difference between the difference to the first candidate and the difference to the second candidate is small and the possibility of mistaking the first and second candidates for each other is high. Recognition errors can therefore be reduced and the recognition rate improved when the waveform of the acquired character waveform data is distorted (stretched or compressed).

Other objects and attainments together with a fuller understanding of the invention will become apparent and appreciated by referring to the following description and claims taken in conjunction with the accompanying drawings.

DESCRIPTION OF EMBODIMENTS

Preferred embodiments of a recording media processing device, a method of controlling the recording media processing device, and a storage medium storing a program according to the present invention are described below with reference to the accompanying figures. A recording media processing device according to this embodiment of the invention is a device that recognizes a string of magnetic ink characters printed on the MICR line of a recording medium in order to verify the validity of the recording medium, which in this embodiment is a business or personal check.

Checks and Magnetic Ink Characters

A check 4 used as an example of the recording medium in this embodiment, and magnetic ink characters 101, are described first.

Figure 1A:
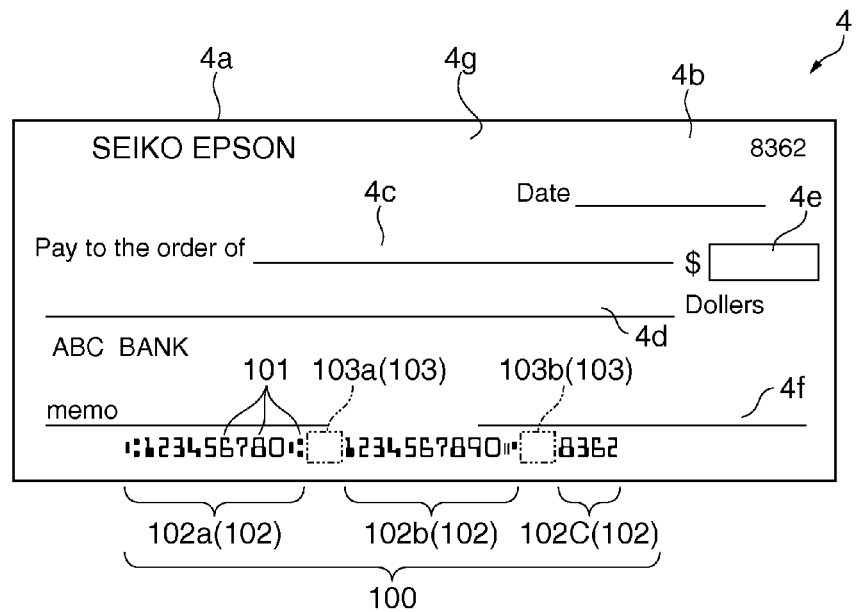
FIG. 1A shows an example of a check.
Figure 1B:
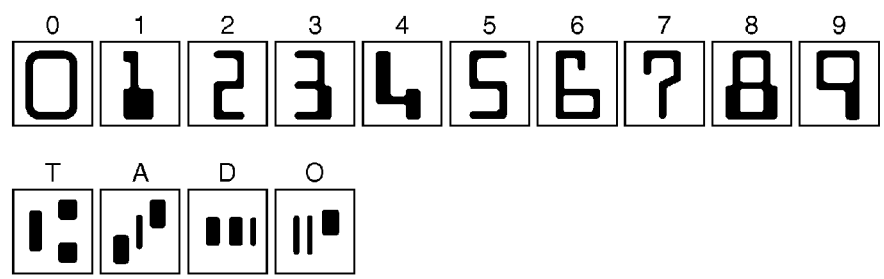
FIG. 1B shows examples of magnetic ink characters.

FIG. 1 shows an example of a check and magnetic ink characters. More specifically, FIG. 1A shows an example of a check, and FIG. 1B shows the characters in the E-13B MICR font.

As shown in FIG. 1A, the check 4 has a date field 4b, payee field 4c, amount fields 4d and 4e, and a signature line 4f on the front 4g of the check form 4a. The check form 4a is a cut-sheet medium. Note that fields 4b to 4f are still empty in FIG. 1. An MICR line 100 containing multiple magnetic ink characters 101 expressing the bank number, account number, and check number is printed along the bottom of the check form 4a. An endorsement area is provided on the back 4h of the check 4 (see FIG. 2).

The MICR line 100 includes plural fields 102 (102a, 102b, 102c) delimited by space characters 103 (103a, 103b). Each of the fields 102a, 102b, 102c is a continuous string of magnetic ink characters 101, and in this example correspond from the left to the bank number, account number, and check number.

As indicated by the imaginary lines in FIG. 1A, a space character 103a is placed between fields 102a and 102b, and a space character 103b is placed between fields 102b and 102c. These space characters 103 (103a, 103b) are recognized as space characters by the check reader 1. The space characters 103 (103a, 103b) may also occupy the width of one or multiple magnetic ink characters 101.

The magnetic ink characters 101 are characters magnetically printed on the check 4 using a specific font (such as the E-13B font), and one magnetic ink character 101 corresponds to one of plural predefined characters.

As shown in FIG. 1B, the E-13B font consists of 14 shapes corresponding to the shapes of the magnetic ink characters 101. These 14 shapes include the 10 numbers 0 to 9, and four special symbols, a transit symbol T, an amount symbol A, a dash symbol D, and an On-Us symbol O.

The MICR line 100 may be printed on the check 4 by an offset printing (printed by an offset printer) or laser printing (printed by a laser printer) process. The actual shapes of the magnetic ink characters 101 in the E-13B font produced by offset printing, and the magnetic ink characters 101 in the E-13B font produced by laser printing, may differ.

Recording Media Processing Device

A recording media processing device according to this embodiment of the invention is described next. A recording media processing device according to this embodiment of the invention includes a check reader 1 and host computer 70.

Figure 2:
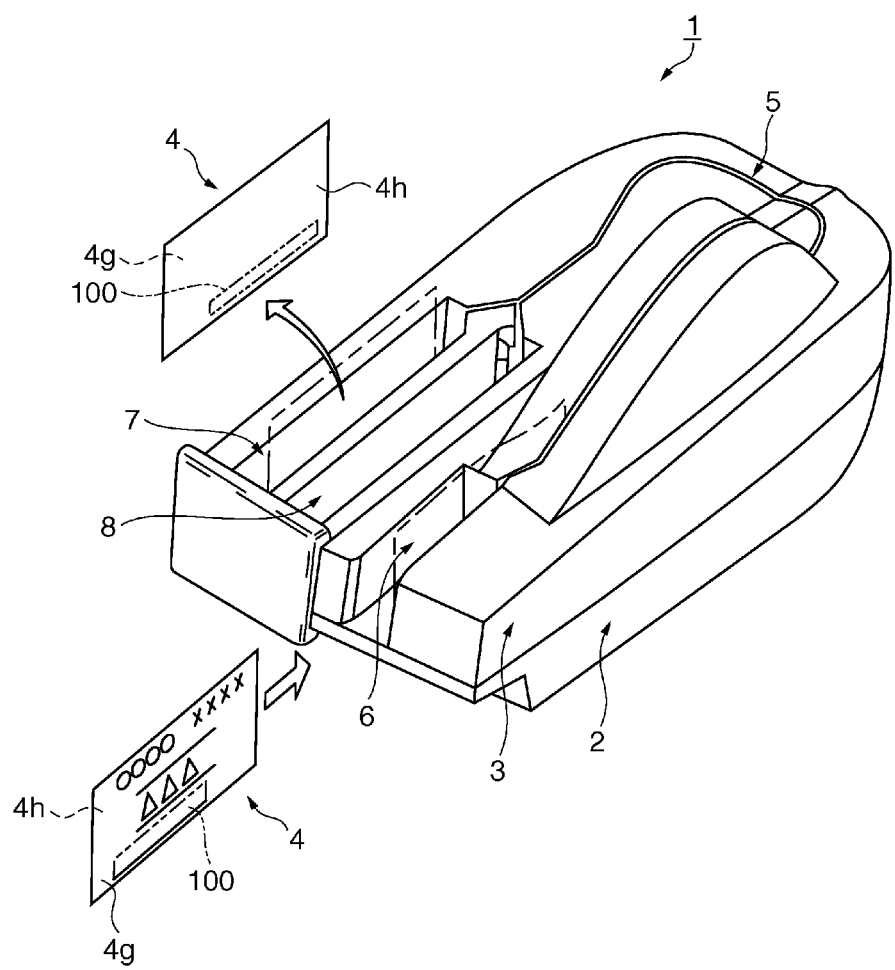
FIG. 2 is an oblique view of a check reader according to a preferred embodiment of the invention.

The basic configuration of a check reader 1 according to this embodiment of the invention is described first. FIG. 2 is an oblique view of the check reader 1 according to this embodiment of the invention. The check reader 1 is a device that processes checks 4, including reading magnetic ink characters recorded on a check 4, scanning both sides of the check 4, and recording a specific image in the endorsement area of the check 4.

The check reader 1 has a bottom case 2, and a cover case 3 covering the top of the bottom case 2, and other components assembled inside. A check 4 conveyance path 5 is formed inside the cover case 3 as a narrow vertical channel that is U-shaped when seen from above. One end of the conveyance path 5 communicates with a check supply unit 6 formed as a wide vertical hopper, and the other end of the conveyance path 5 splits left and right into first check discharge unit 7 and second check discharge unit 8, both of which are also wide vertical pockets.

Checks 4 are inserted to the check supply unit 6 with the top and bottom edges aligned so that the top edges (up in FIG. 1A) are up and the bottom edges (down in FIG. 1A) down, and the front and back sides matched so that the front 4g faces the outside of the U-shaped conveyance path 5 (as shown in FIG. 2). The checks 4 inserted to the check supply unit 6 are conveyed through the conveyance path 5 with the right edge shown in FIG. 1 as the leading end.

As a check 4 fed from the check supply unit 6 is conveyed through the conveyance path 5, a front image, which is an image of the front 4g, and a back image, which is an image of the back 4h, are scanned, and the MICR line 100 recorded on the front 4g is magnetically read. Checks 4 from which the MICR line 100 is successfully read are then discharged into the first check discharge unit 7 after a specific endorsement image is recorded thereon.

Checks 4 from which reading the MICR line 100 failed are then discharged into the second check discharge unit 8 without recording the specific endorsement image. A check 4 discharged into the second check discharge unit 8 may then be examined to determine why reading failed, or scanned again, for example.

Figure 3:
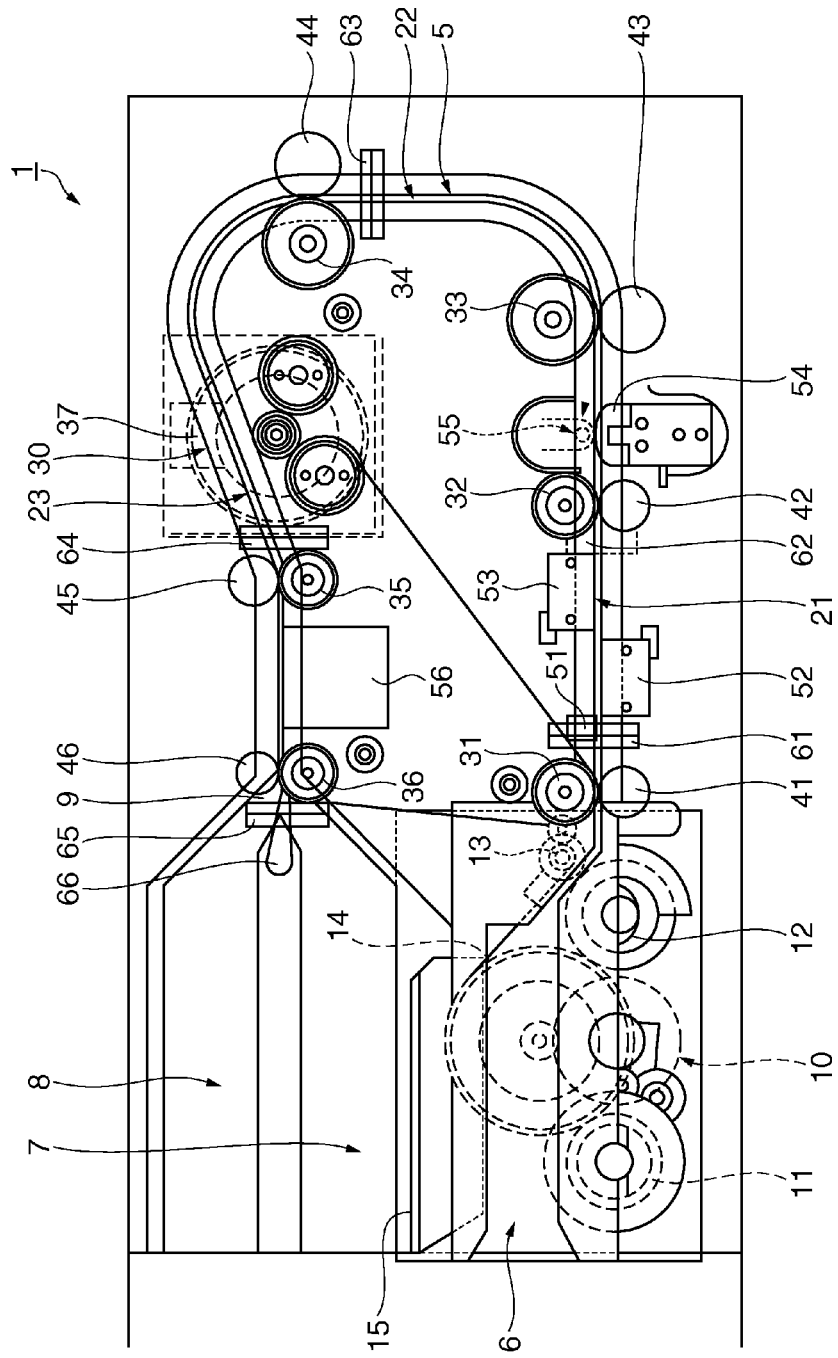
FIG. 3 shows the internal configuration of the check reader.

FIG. 3 shows the internal configuration of the check reader 1. The check supply unit 6 has a check feed mechanism 10 for feeding checks 4 (see FIG. 2) into the conveyance path 5. The check feed mechanism 10 includes a delivery roller 11, a feed roller 12, a retard roller 13 pressed against the feed roller 12, a paper feed motor 14, and a check-pressing hopper 15.

When the paper feed motor 14 drives, the checks 4 loaded in the check supply unit 6 are pressed by the check-pressing hopper 15 to the delivery roller 11 side, and the delivery roller 11 and feed roller 12 are then driven synchronously.

The check 4 is then fed between the feed roller 12 and retard roller 13 by the delivery roller 11. A specific rotational load is applied to the retard roller 13, and only the one check 4 directly contacting the feed roller 12 is separated from the other checks 4 and fed into the conveyance path 5.

The conveyance path 5 is U-shaped as described above, and has a straight upstream conveyance path portion 21 connected to the check supply unit 6, a downstream conveyance path portion 23 that curves slightly and connects to the first check discharge unit 7 and second check discharge unit 8, and a curved conveyance path portion 22 that connects the upstream conveyance path portion 21 and downstream conveyance path portion 23.

A check conveyance mechanism 30 conveys checks 4 fed into the conveyance path 5 from the check supply unit 6 through the conveyance path 5. The check conveyance mechanism 30 includes first to sixth conveyance rollers 31 to 36, first to sixth pressure rollers 41 to 46 that are pressed against and rotate in unison with the opposing conveyance rollers, and a conveyance motor 37 that rotationally drives the first to sixth conveyance rollers 31 to 36.

The first to sixth conveyance rollers 31 to 36 rotate synchronously. A stepper motor, for example, is used as the conveyance motor 37. The conveyance distance of a check 4 can therefore be known from the number of steps the stepper motor is driven.

The first to third conveyance rollers 31 to 33 are respectively disposed at the upstream end and middle of the upstream conveyance path portion 21, and at the junction to the curved conveyance path portion 22. The fourth conveyance roller 34 is disposed to the downstream end of the curved conveyance path portion 22. The fifth and sixth conveyance rollers 35, 36 are respectively disposed in the middle and downstream end of the downstream conveyance path portion 23.

A magnet 51 for magnetizing magnetic ink characters, a front contact image sensor 52, and a back contact image sensor 53 are disposed in order from the upstream end of the upstream conveyance path portion 21 between the first conveyance roller 31 and second conveyance roller 32. The MICR line 100 recorded on a check 4 is magnetized by the magnet 51.

The front contact image sensor 52 faces the front 4g of the check 4 conveyed through the conveyance path 5, and scans a front image, which is an image of the front 4g. The back contact image sensor 53 faces the back 4h of the check 4 conveyed through the conveyance path 5, and scans a back image, which is an image of the back 4h.

A magnetic head 54 is disposed between the second conveyance roller 32 and third conveyance roller 33 as a magnetic reading unit that reads the magnetic ink characters 101. The magnetic head 54 magnetically reads the MICR line 100 by detecting change in the magnetic flux density (voltage change, current change) of the magnetized MICR line 100 at a specific sampling period to acquire signal waveform data as the recording medium is conveyed past the magnetic head 54.

A pressure plate 55 that presses the check 4 against the magnetic head 54 is disposed opposite the head. A recording device 56 for recording a specific endorsement image is disposed to the downstream conveyance path portion 23 between the fifth conveyance roller 35 and sixth conveyance roller 36. The recording device 56 includes a printhead, stamp, or other means capable of recording a specific image in an appropriate direction at a suitable position on the back 4h of the check 4 conveyed through the conveyance path 5.

Various sensors for controlling check conveyance are also disposed to the conveyance path 5. A paper length detector 61 for detecting the length of the conveyed check 4 is disposed at a position before the magnet 51. A multifeed detector 62 for detecting if checks 4 are multifed is disposed between the back contact image sensor 53 and the second conveyance roller 32. A jam detector 63 is disposed at a position before the fourth conveyance roller 34, and a paper jam resulting from the check 4 being stuck in the conveyance path 5 is detected when a check 4 is detected continuously for at least a specific time by the jam detector 63.

A printing detector 64 for detecting the presence of a check 4 to be endorsed by the recording device 56 is disposed at a position before the fifth conveyance roller 35. A discharge detector 65 is disposed at a position downstream from the sixth conveyance roller 36, that is, at the junction 9 where the conveyance path 5 branches to the first check discharge unit 7 and second check discharge unit 8, to detect discharged checks 4.

A flapper 66 that is operated by a drive motor 67 (see FIG. 4) is disposed to the junction 9. The flapper 66 selectively communicates the downstream end of the conveyance path 5 with the first check discharge unit 7 or second check discharge unit 8, and guides the check 4 into the selected discharge unit.

Figure 4:
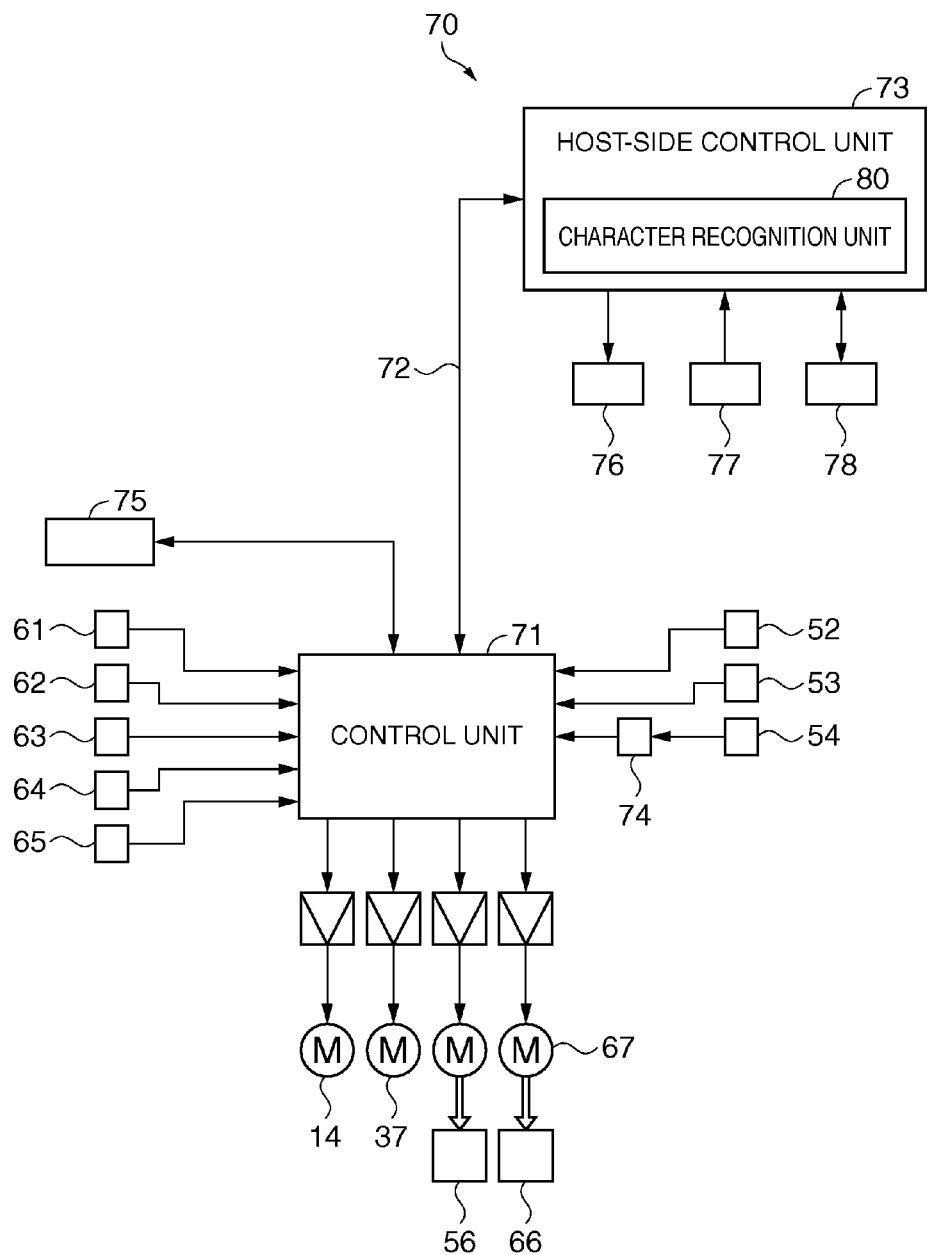
FIG. 4 is a block diagram showing the functional configuration of the check reader.

FIG. 4 is a block diagram showing the functional configuration of the check reader 1. A control unit 71 centrally controls other parts of the check reader 1 as controlled by the host-side control unit 73 of the host computer 70 described below, and includes a CPU, RAM, ROM, and other peripheral circuits.

As controlled by the host-side control unit 73, the control unit 71 drives the paper feed motor 14 and conveyance motor 37 to feed the checks 4 one at a time into the conveyance path 5 (FIG. 2), and convey the supplied check 4 through the conveyance path 5. Conveyance control of a check 4 by the control unit 71 is based on detection signals from the paper length detector 61, multifeed detector 62, jam detector 63, printing detector 64, and discharge detector 65 disposed to the conveyance path 5.

As a check 4 is conveyed, the front contact image sensor 52 and back contact image sensor 53 scan front and back images of the check 4 conveyed through the conveyance path 5, and output the image data of the captured images to the control unit 71. The control unit 71 outputs this image data to the host-side control unit 73.

The magnetic head 54 detects the electromagnetic force produced by change in the magnetic field created by the passing MICR line 100 (FIG. 1A) as controlled by the control unit 71, and outputs the resulting detection signal to a signal processing circuit 74.

The signal processing circuit 74 includes an amplifier, filter for removing noise, and A/D converter, amplifies and waveshapes the detection signal input from the magnetic head 54, and outputs the result as data to the control unit 71. The control unit 71 sends data describing the detection signal input from the signal processing circuit 74 to the host-side control unit 73.

An operating unit 75 includes switches such as a power switch and operating switches disposed to the bottom case 2 (FIG. 2), detects user operation of these switches, and outputs to the control unit 71.

A host computer 70 is connected to the check reader 1 through a communication cable 72. The host computer 70 has a host-side control unit 73 including a CPU, RAM, ROM, and other peripheral circuits. The host-side control unit 73 includes a character recognition unit 80 described below.

Connected to the host-side control unit 73 are a display 76 for displaying information, an operating unit 77 to which input devices such as a keyboard and mouse are connected, and a storage unit 78 such as an EEPROM or hard disk device capable of storing data rewritably. The storage unit 78 stores data for the front and back images of the checks 4 input from the check reader 1, and detection signal data.

In this embodiment of the invention the control unit 71 of the check reader 1 controls parts of the check reader 1 as controlled by the host-side control unit 73 of the host computer 70. More specifically, the host-side control unit 73 controls parts of the check reader 1 by the CPU of the control unit 73 running a program stored in ROM, generating control data (commands) for controlling the control unit 71, and outputting the resulting control data to the control unit 71 of the check reader 1. The host computer 70 and check reader 1 in this embodiment of the invention thus cooperate to function as a recording media processing device for processing checks 4 as the recording medium.

Using a check 4 for a business transaction is described briefly next. The buyer of some product writes the date, payee, amount (in numbers and words), and signature in the fields 4b, 4c, 4d, 4e, 4f of the check form 4a (see FIG. 1A), and then presents the check 4 to the payee. The payee then recognizes the MICR line 100 with the check reader 1, and determines the validity of the check 4 by verifying the recognized data with a specific institution.

If check 4 validity is confirmed, endorsement information is recorded on the back of the check 4. The amount may then be printed on the endorsed check 4 in a MICR line 100 of magnetic ink characters 101 on the right by the payee, bank, or payment processing center. The check 4 is then processed through the settlement system of the bank, and the amount specified in the MICR line 100 is remitted to the endorsing payee. Reading the MICR line 100 and accurate character recognition are therefore required for check 4 processing.

Character Recognition Unit

The character recognition unit 80 of the host-side control unit 73 is described next. The function of the character recognition unit 80 is achieved by the cooperation of hardware and software, such as the CPU of the host-side control unit 73 running a program stored in ROM.

The character recognition unit 80 applies a character recognition process to each magnetic ink character 101 in the MICR line 100. Character recognition refers to identifying (recognizing) each magnetic ink character 101 in the magnetic ink characters 101 that were read, or determining that the magnetic ink character 101 cannot be identified (recognized).

If all of the magnetic ink characters 101 in the MICR line 100 can be recognized, this embodiment determines that reading the MICR line 100 succeeded. Reading the MICR line 100 fails if there is even only one magnetic ink character 101 that cannot be recognized.

In this embodiment, the MICR line 100 recorded on a check 4 is read by the magnetic head 54 as the check 4 travels through the conveyance path 5 as described above. The MICR line 100 is read by the magnetic head 54 detecting change in the magnetic flux density of the MICR line 100 on the conveyed check 4 at a specific sampling period from the right end (the right in FIG. 1A) to the left end (the left in FIG. 1A).

Figure 5A:
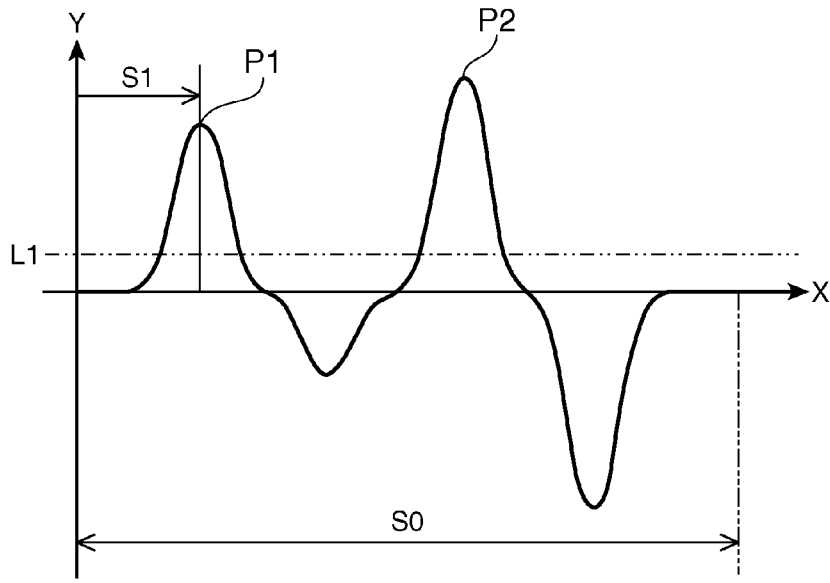
FIG. 5A shows an example of character waveform data.
Figure 5B:
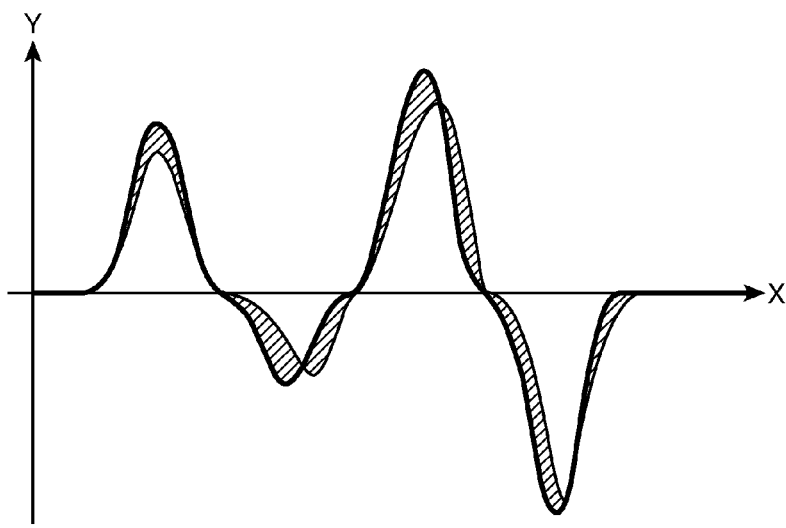
FIG. 5B shows an example of the difference between character waveform data and reference waveform data.

FIG. 5 shows an example of character waveform data. More specifically, FIG. 5A shows the character waveform data for one character in the magnetic ink character 101 set, and FIG. 5B describes the difference between the character waveform data and reference waveform data. FIG. 5A and FIG. 5B show the character waveform data for the number 4.

Reading with the magnetic head 54 produces a continuous waveform such as shown in FIG. 5A for one character as the signal waveform data representing one magnetic ink character in the MICR line 100. Below, the shortest interval in the sampling period is one sampling unit, and seven sampling units are referred to as one mesh.

The character recognition unit 80 applies processes including extracting and normalizing character waveform data for one character to the acquired signal waveform data. Extracting character waveform data refers to generating character waveform data such as shown in FIG. 5A for each magnetic ink character 101 in the MICR line 100 based on the signal waveform data acquired by reading the MICR line 100.

The passage of time (sampling period) is shown on the x-axis (horizontal axis) in FIG. 5A, and the sampling units pass sequentially to the right from the origin along the x-axis. The y-axis (vertical axis) shows the relative change in magnetic flux density over time, the amplitude of the character waveform data (change on the y-axis) is divided into 256 levels, and level 128 is at the origin (0 level).

Relative change in magnetic flux density during each specific sampling period is shown in FIG. 5A from the origin to the right on the x-axis (from the right side to the left side of the number 4 shown in FIG. 1B). The value on the y-axis moves up or down according to the change in the magnetic flux density of the magnetic ink character 101, and the value on the y-axis goes positive or negative according to whether the change in the magnetic flux density is positive or negative.

As shown in FIG. 5A, the period S0 on the x-axis occupied by character waveform data for one character is defined as a specific number of sampling units, and media conveyance is controlled and the length of one sampling unit is defined accordingly. Period S0 is also defined so that first peak P1, which is the first peak detected, is at specific period S1 from the start of character extraction in the character waveform data for one character.

In this embodiment the period S0 occupied by the waveform for one character is 70 sampling units (10 mesh) and the specific period S1 is 11 sampling units, for example. The character recognition unit 80 therefore analyzes the signal waveform data, and of the waveform peaks exceeding a specific level L1, detects the first peak P1 that appears from the origin to the end of the waveform (right on the x-axis) as the first peak.

A peak is a high or low point in the signal waveform data, and these peaks appear at a specific period along the x-axis. Peaks on the positive side are called positive peaks, and peaks on the negative side are called negative peaks. The value on the x-axis corresponding to each peak is called the position (level) of the peak. The character waveform data of each of the 14 magnetic ink characters 101 has plural positive peaks and negative peaks.

For each magnetic ink character 101 in the MICR line 100, the character recognition unit 80 determines the start character extraction position so that the position of the detected first peak P1 is at the eleventh sampling unit on the x-axis of the extracted waveform. The character recognition unit 80 then extracts the character waveform data in the 70 sampling units (10 mesh) occupied by the waveform for one character from this start character extraction position. The magnetic ink character 101 corresponding to the character waveform data extracted for one character is referred to below as the target character.

The character recognition unit 80 then normalizes the extracted character waveform data so that the amplitude levels on the y-axis coincide with the reference waveform data for pattern matching shown by the bold line in FIG. 5B. The reference waveform data is template data for the ideal waveform resulting from the magnetic head 54 reading a magnetic ink character 101 corresponding to one of the fourteen MICR characters. The reference waveform data is stored in ROM of the host-side control unit 73.

The character recognition unit 80 then recognizes each of the magnetic ink characters 101 in the MICR line 100 from the extracted character waveform data based on specific recognition conditions. The magnetic ink character 101 recognition process either identifies the magnetic ink character 101 that was read, or determines that character recognition is not possible. Character recognition is further described below.

The character recognition unit 80 then compares the normalized character waveform data indicated by the thin line in FIG. 5B with reference waveform data for each character, and detects the difference therebetween. This difference is the size of the shaded area in FIG. 5B, and more specifically is the sum of the absolute values of the y-axis value of the waveform described by the character waveform data (signal level), and the y-axis value of the waveform described by the reference waveform data.

The smaller the difference between the character waveform data for one character and the reference waveform data for the same character, the closer the resemblance between the waveform represented by the character waveform data and the waveform represented by the reference waveform data, and the greater the probability that the magnetic ink character 101 described by the character waveform data is the character described by the reference waveform data.

After calculating the difference between the character waveform data for the one character and all 14 MICR characters, the character recognition unit 80 selects the character corresponding to the reference waveform data with the smallest difference as a first candidate, and the character corresponding to the reference waveform data with the next-smallest difference as a second candidate. The character recognition unit 80 then compares the difference between the character waveform data and the reference waveform data for the characters selected as the first candidate and second candidate with a specific threshold.

If the difference between the character waveform data and the reference waveform data used as the first candidate is less than or equal to the threshold as a result of comparing the difference with the threshold, and the difference between the character waveform data and the reference waveform data used as the second candidate is greater than the threshold, the magnetic ink character 101 is considered recognized, and the character selected as the first candidate is output as the recognized character obtained by character recognition.

The threshold used for magnetic recognition is set appropriately so that only the difference between the character waveform data and the reference waveform data for the correct character is less than or equal to the specific threshold, and the difference between the character waveform data and the reference waveform data for the other characters exceeds the threshold. As a result, if the difference with the first candidate exceeds the threshold, or there are plural characters resulting in a difference less than or equal to the threshold, an error such as a read error with the magnetic head 54 or a check 4 conveyance error may have occurred resulting in a recognition error, and recognition is determined not possible.

Characters are recognized using a simple comparison and a sliding comparison in the first recognition phase and third recognition phase of the character recognition process described below. A simple comparison means simply comparing the waveform of the character waveform data for the target character with the waveform of the reference waveform data. A sliding comparison means sliding the waveform of the character waveform data for the target character and the waveform of the reference waveform data a specific distance (number of sampling units) in a specific range for comparison.

Stretching or compression of the waveform on the x-axis may occur in the acquired character waveform data due to variation in the character width of the magnetic ink characters 101 printed on the check 4, or deviation in the pitch while conveying the check 4 through the check reader 1, for example. When this happens, the difference between the reference waveform data and character waveform data increases even though the reference waveform data is for the character corresponding to the target character when the difference between the character waveform data of the target character and the reference waveform data is calculated by a simple comparison or sliding comparison. The target character is then determined unrecognizable and the recognition rate drops.

This embodiment of the invention therefore reduces the effect of stretching or compression of the character data waveform on recognition by applying a scaling process that stretches or compresses the waveform of the reference waveform data for the character compared with the target character, and calculating the difference between the character waveform data of the target character and the scaled reference waveform data, in the second recognition phase and fourth recognition phase of the character recognition process described below.

The process of scaling the waveform of the reference waveform data sets a scaling point at the point between the first peak P1 and the second peak P2 where the change per sampling unit is small (the point where the signal level on the y-axis crosses the origin (0 level)), and sliding the waveform to the right (right on the x-axis) of the scaling point a specific distance (number of sampling units) in a specific range.

Note that if the scaling point is set to a position where the change is great, the difference to the character waveform data may be increased because only part of the waveform of the reference waveform data will be shifted. The scaling point is therefore preferably set to a point where the change is small. The specific range and the specific distance that the waveform of the reference waveform data is slid are set according to the shape of the waveform of the reference waveform data for each character.

However, depending upon the character represented by the magnetic ink character 101, scaling the waveform could result in a resemblance to a different character.

Figure 6A:
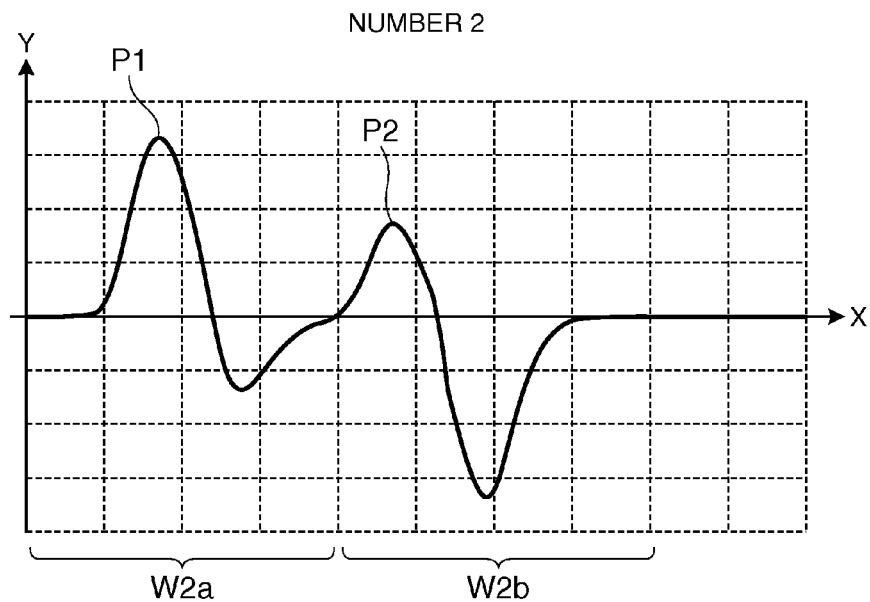
FIG. 6A shows an example of reference waveform data for the number 2 as an example of a character that will resemble a different character if the waveform is stretched or compressed.
Figure 6B:
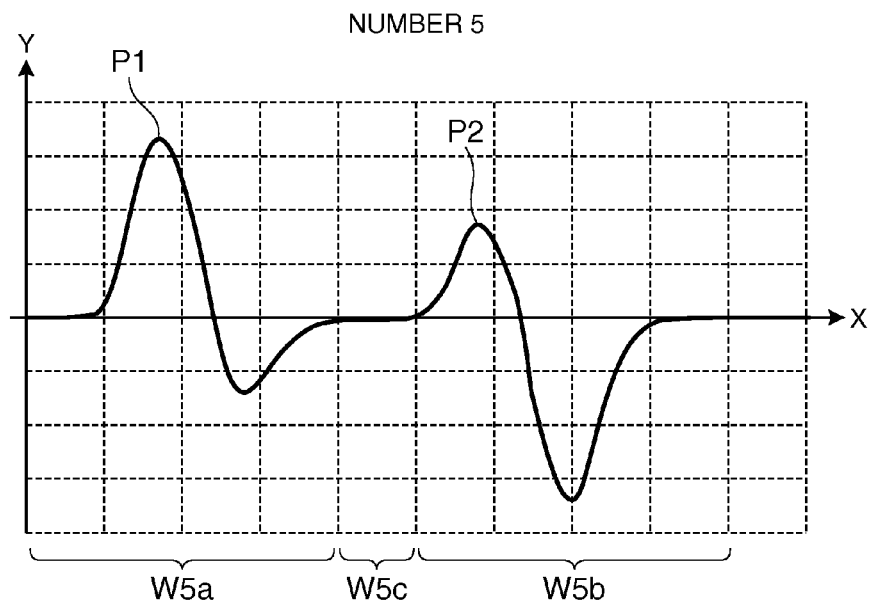
FIG. 6B shows an example of reference waveform data for the number 5 as an example of a character that will resemble a different character if the waveform is stretched or compressed.
Figure 7A:
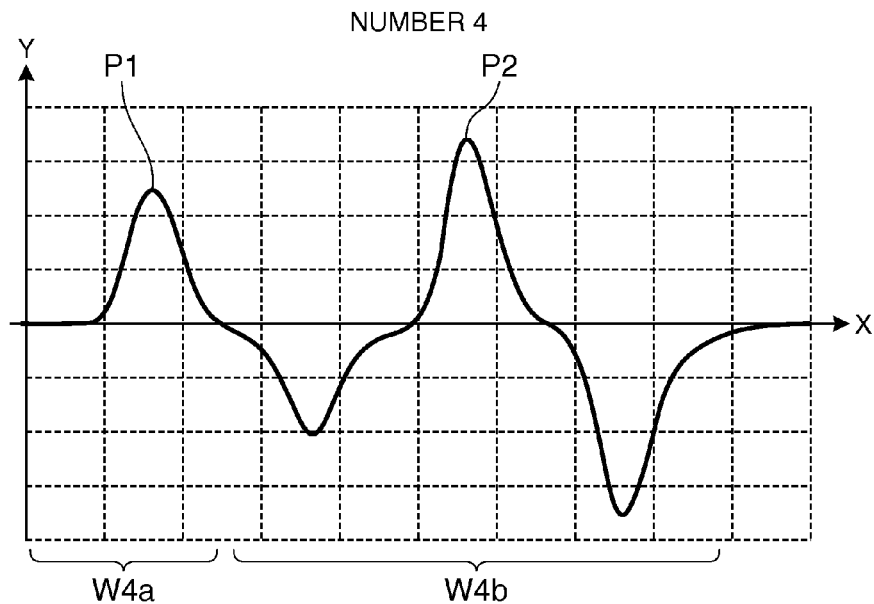
FIG. 7A shows an example of reference waveform data for the number 4 as an example of a character that will resemble a different character if the waveform is stretched or compressed.
Figure 7B:
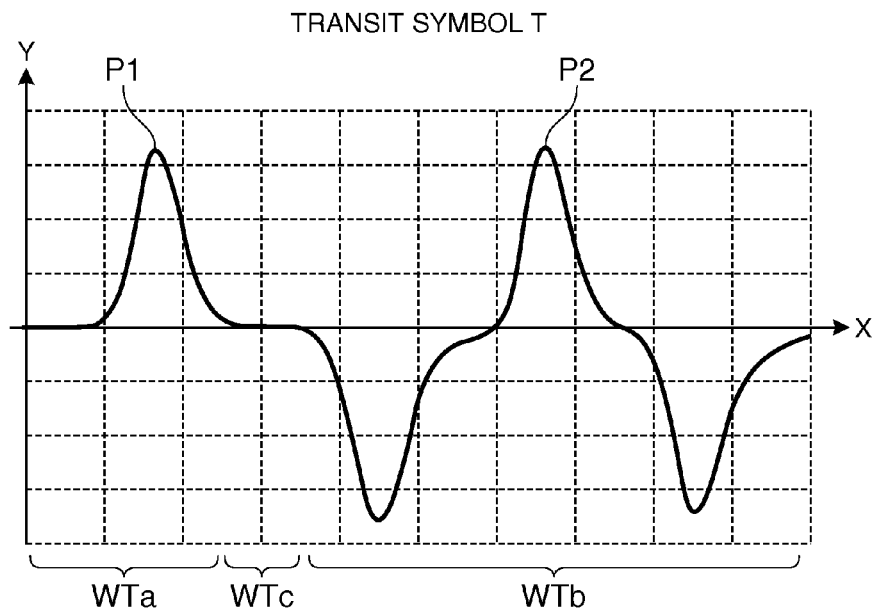
FIG. 7B shows an example of reference waveform data for the transit symbol T as an example of a character that will resemble a different character if the waveform is stretched or compressed.

FIG. 6 and FIG. 7 show the waveforms of the reference waveform data for characters that become similar when waveform scaling is applied. More specifically, FIG. 6A shows the reference waveform for the number 2, and FIG. 6B shows the waveform for the number 5. FIG. 7A shows the waveform for the number 4, and FIG. 7B shows the waveform for the transit symbol T. The scale of the x-axis in FIG. 6A, FIG. 6B, FIG. 7A, and FIG. 7B is in units of 1 mesh.

As shown in FIG. 6A, the waveform for the number 2 has a waveform W2a on the first peak P1 side, and a waveform W2b on the second peak P2 side. As shown in FIG. 6B, the waveform for the number 5 has a waveform W5a on the first peak P1 side, a waveform W5b on the second peak P2 side, and a waveform W5c between waveform W5a and waveform W5b. Note that waveform W5c is an approximately 1 mesh wide portion of the signal wave where there is substantially no change in level.

Comparing the waveform of the reference waveform data for the number 2 in FIG. 6A, and the waveform of the reference waveform data for the number 5 in FIG. 6B, waveform W2a and waveform W5a are similar to each other, and waveform W2b and waveform W5b are similar to each other. As a result, if waveform W2b is slid 1 mesh right on the x-axis in the waveform of the reference waveform data for the number 2, the resulting waveform resembles the reference waveform for the number 5. If waveform W5b is slid 1 mesh left on the x-axis in the reference waveform for the number 5, the resulting waveform resembles the reference waveform for the number 2.

When the waveforms become similar, the difference therebetween after scaling or sliding becomes smaller than the initial difference between the waveforms. Whether or not similar waveforms will result from scaling and sliding can therefore be determined. Note that the waveform difference is calculated the same way as described in FIG. 5B.

If the reference waveform for the number 4 shown in FIG. 7A and the reference waveform for the transit symbol T shown in FIG. 7B are compared, the waveform W4a on the first peak P1 side and waveform W4b on the second peak P2 side of the number 4, and the waveform WTa on the first peak P1 side and waveform WTb on the second peak P2 side of the transit symbol T, are similar except in the area of waveform WTc of the transit symbol T. As a result, if waveform W4b of the number 4 is slid 1 mesh right on the x-axis, the resulting waveform resembles the reference waveform data for the transit symbol T. If waveform WTb of the transit symbol T is slid 1 mesh left on the x-axis, the resulting waveform resembles the reference waveform for the number 4.

When the waveforms become similar, the difference therebetween after scaling or sliding becomes smaller than the initial difference between the waveforms. Whether or not similar waveforms will result from scaling and sliding can therefore be determined. Note that the waveform difference is calculated the same way as described in FIG. 5B.

Therefore, when the waveforms of the first candidate and the second candidate characters will resemble each other if the waveforms are scaled, such as when the first and second candidate characters are the number 2 and the number 5, or the number 4 and the transit symbol T, and the waveforms of the reference waveform data are scaled and compared, the characters in such pairs can be mistakenly recognized for each other, resulting in a target character recognition error.

The character recognition process according to this embodiment of the invention includes a step that reduces recognition errors when the waveforms of the characters selected as the first candidate and second candidate resemble each other after scaling.

Character Recognition Process

Figure 8:
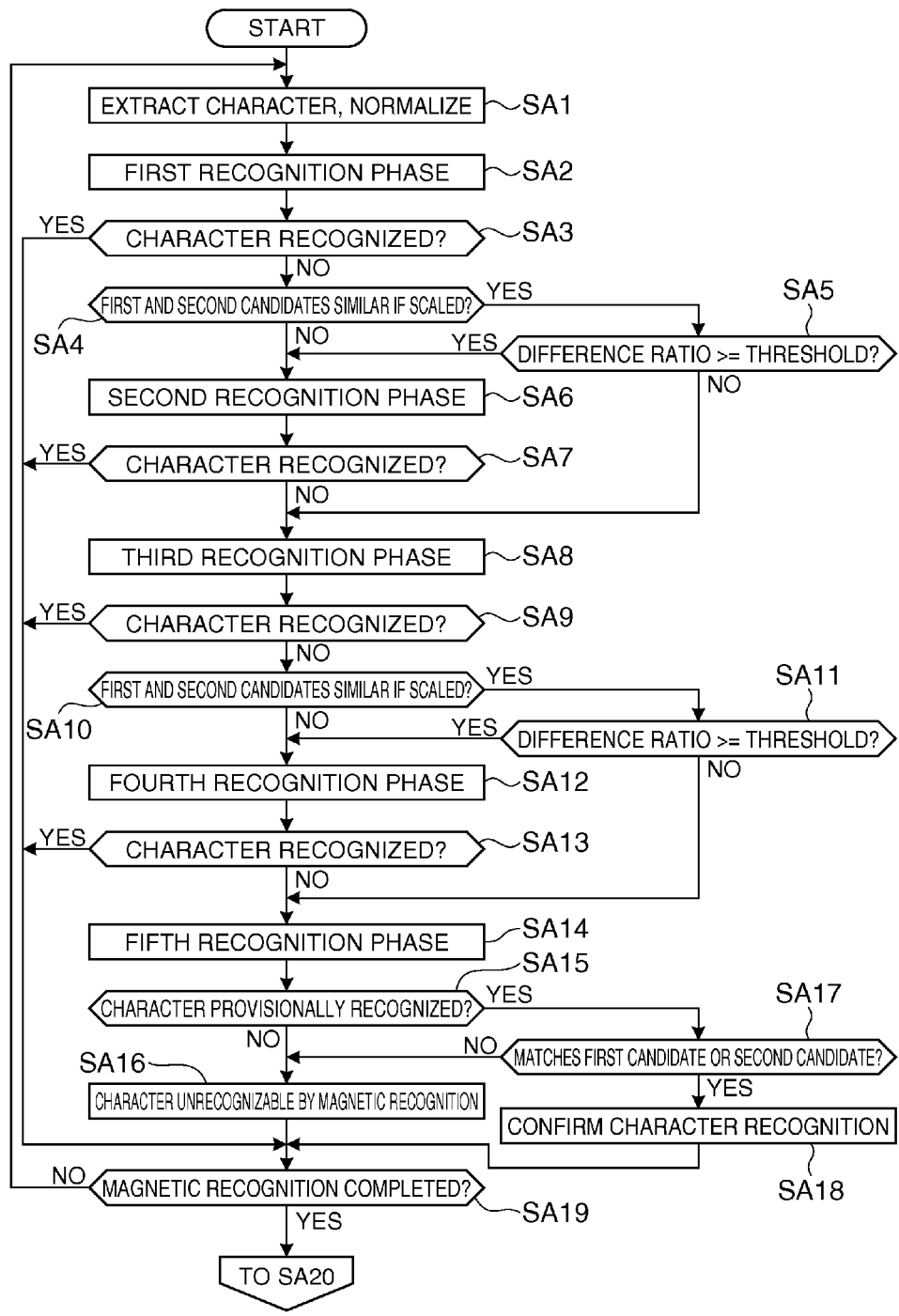
FIG. 8 is a flow chart describing the character recognition process in a check reader according to the invention.
Figure 9:
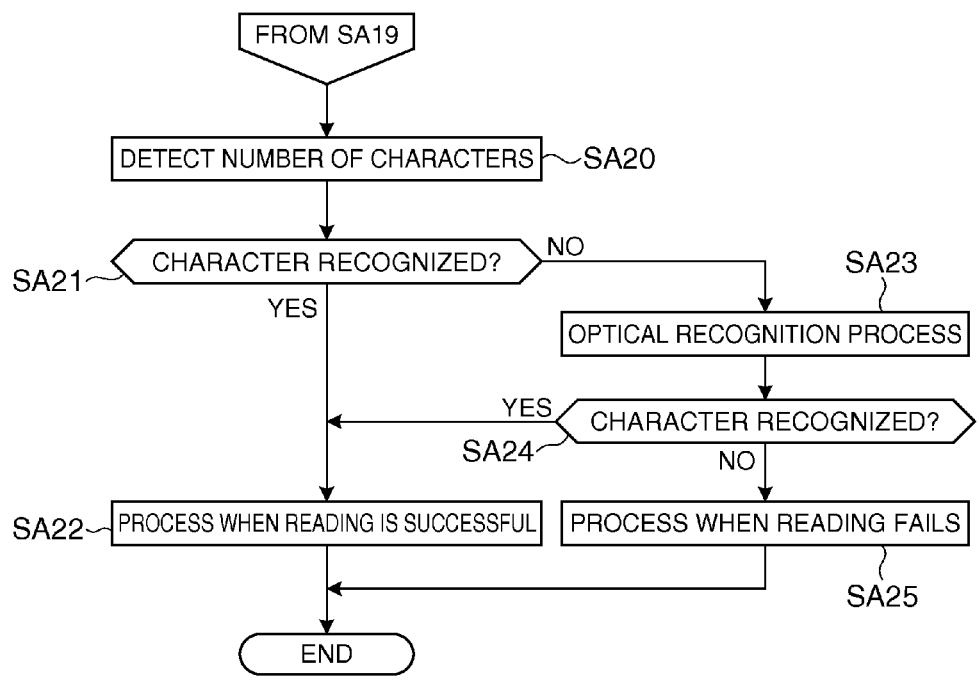
FIG. 9 is a flow chart describing the character recognition process in a check reader according to the invention.

The character recognition process in the check reader 1 according to this embodiment of the invention is described next. FIG. 8 and FIG. 9 are flow charts describing the character recognition process in a check reader 1 according to this embodiment.

The MICR line 100 recorded on the check 4 is read by the magnetic head 54 before step SA1 in FIG. 8. Signal waveform data generated by the signal processing circuit 74 amplifying, filtering, and wave-shaping the read signal is then output by the control unit 71 to the host-side control unit 73. The front contact image sensor 52 also images the front of the check 4, and the image data is output from the control unit 71 to the host-side control unit 73.

Then in step SA1, the first peak P1 (FIG. 5A) used as the reference for the start character extraction position is detected in the acquired signal waveform data. Based on the position of the detected first peak P1, the character recognition unit 80 extracts character waveform data for one character corresponding to a magnetic ink character 101 from the signal waveform data, and applies a normalization process to the extracted character waveform data.

The magnetic recognition process described from step SA2 below has five recognition phases from a first recognition phase in step SA2 to a fifth recognition phase in step SA14. These five recognition phases apply magnetic recognition to the character waveform data of the target character using different methods.

These five recognition phases are sequentially applied to the character waveform data of the target character extracted in step SA1. If the target character is successfully recognized in any of the first to fourth of the five recognition phases, the next magnetic ink character 101 is made the target character and magnetic recognition is applied to the character waveform data for the new target character without proceeding to the next phase.

If the target character cannot be recognized in these five recognition phases, the optical recognition process described below in step SA23 (FIG. 9) is applied to the target character.

As described above, the shapes of magnetic ink characters 101 printed by offset and laser printing processes may differ slightly. The reference waveform data therefore includes reference waveform data for offset printing, and reference waveform data for laser printing. This embodiment uses the reference waveform data for offset printing in the first and second recognition phases, and uses reference waveform data for laser printing in the third and fourth recognition phases.

In the first recognition phase in step SA2, the character recognition unit 80 calculates the difference between the character waveform data for the target character and the reference waveform data for the 14 MICR characters by means of a simple comparison and a sliding comparison. As described above, if the difference between the character waveform data and the reference waveform data of the first candidate character is less than or equal to the threshold, and the difference between the character waveform data and the reference waveform data of the second candidate character is greater than the threshold, recognition of the target character is confirmed. The first recognition phase ends without applying the sliding comparison if the target character is successfully recognized as a result of the simple comparison.

In step SA3, the character recognition unit 80 determines if the target character was recognized in the first recognition phase in step SA2. If the target character was recognized (step SA3 returns YES), the character recognition unit 80 goes to step SA4 instead of going to step SA4 because the character was recognized. If the target character was not recognized (step SA3 returns NO), the character recognition unit 80 goes to step SA4.

In step SA4 the character recognition unit 80 determines if the characters used as the first candidate and second candidate in the first recognition phase are characters that will have similar waveforms if the waveform of the reference waveform data therefor is scaled. Step SA4 is used to suppress recognition errors resulting from applying the second recognition phase if the reference waveforms will resemble each other after the waveforms are scaled.

Based on the result of the sliding comparison in the first recognition phase, step SA4 determines if the characters selected as the first and second candidate characters are characters that will resemble each other if the waveforms of the reference waveform data are scaled. If the difference between the reference waveform data for the first and second candidate characters is smaller after scaling than before scaling, it is determined that the waveforms will be similar.

The character recognition unit 80 could decide in step SA4 that the first and second candidate characters are characters that will have similar waveforms if their reference waveforms are scaled when the first and second candidate characters are the number 2 and number 5, or the number 4 and transit symbol T. This decision can be quickly processed by storing combinations of characters that have similar waveforms when their reference waveforms are scaled, such as the number 2 and number 5, and the number 4 and transit symbol T, in ROM or other memory accessible to the control unit 71, and looking for the target combination in memory.

However, if the decision is based on the result of a sliding comparison in the first recognition phase as in this embodiment, whether or not the waveforms will actually resemble each other after waveform scaling can be determined based on the actual stretching or compression of the waveform of the target character due to variation in the character width of the printed magnetic ink characters 101 or deviation in the pitch of check 4 conveyance.

If the first and second candidate characters are characters with waveforms that will resemble each other if the waveforms of the reference waveform data are scaled (step SA4 returns YES), the character recognition unit 80 goes to step SA5. However, if the first and second candidate characters not are characters with waveforms that will resemble each other if the waveforms of the reference waveform data are scaled (step SA4 returns NO), the character recognition unit 80 goes to the second recognition phase in step SA6.

Like step SA4, step SA5 suppresses recognition errors that can occur if the second recognition phase is executed when scaling will make the waveforms resemble each other.

In step SA5 the character recognition unit 80 determines if the ratio of the difference between the reference waveform data of the second candidate character and the character waveform data of the target character (below, difference B) to the difference between the reference waveform data of the first candidate character and the character waveform data (below, difference A) is greater than or equal to a specific value. This specific value is 1.25 in this embodiment, for example. More specifically, the character recognition unit 80 determines in step SA5 if difference B is at least 1.25 times A (difference B/difference A>=1.25).

Step SA5 is a step that determines if the possibility is greater that the first candidate character is the target character than the second candidate character. Because step SA4 already determined that the first and second candidate characters are characters with waveforms that will resemble each other if the waveforms of the reference waveform data are scaled, the possibility is high that first and second candidate characters will be mistakenly recognized for each other if the waveforms of the reference waveform data are scaled for comparison when the difference between difference A and difference B is small (in this embodiment, when difference B is less than 1.25 times A).

If the difference between difference A and difference B is large (in this embodiment, difference B is greater than 1.25 times A), the possibility is high that the target character is the first candidate character. Therefore, even if the first and second candidate characters are characters with waveforms that will resemble each other if the waveforms of the reference waveform data are scaled, the possibility of scaling causing a recognition error is low, and scaling the waveform of the reference waveform data for comparison could conversely enable character recognition and improve the recognition rate.

If difference B is 1.25 A or more in step SA5 (step SA5 returns YES), the character recognition unit 80 goes to the second recognition phase in step SA6. If difference B is less than 1.25 A in step SA5 (step SA5 returns NO), the character recognition unit 80 skips the second recognition phase and goes to the third recognition phase in step SA8.

In the second recognition phase in step SA6, the character recognition unit 80 slides and corrects the waveform of the reference waveform data for the compared character a specific distance in a specific range referenced to the scaling point, and calculates the difference between the waveform of the character waveform data for the target character and each of the corrected reference waveforms. The character recognition unit 80 then determines that the target character was recognized if the difference between the character waveform data and the reference waveform data for the first candidate is less than or equal to the threshold, and the difference between the character waveform data and the reference waveform data of the second candidate exceeds the threshold.

In the next step SA7, the character recognition unit 80 determines if the target character was recognized in the second recognition phase in step SA6. If the target character was recognized (step SA7 returns YES), the character recognition unit 80 skips the third recognition phase and goes directly to step SA19. If the target character was not recognized (step SA7 returns NO), the character recognition unit 80 executes the third recognition phase in step SA8.

The third recognition phase in step SA8 uses the reference waveform data for laser printing, the operation is the same as in the first recognition phase of step SA2, and further description thereof is thus omitted.

In step SA9 following the third recognition phase, the character recognition unit 80 determines if the target character was recognized in the third recognition phase in step SA8. If the target character was recognized (step SA9 returns YES), the character recognition unit 80 skips the fourth recognition phase and goes directly to step SA19. If the target character was not recognized (step SA9 returns NO), the character recognition unit 80 goes to step SA10.

Step SA10 is the same as step SA4. In step SA10, the character recognition unit 80 determines if the characters used as the first candidate and second candidate in the first recognition phase or third recognition phase are characters that will have similar waveforms if the waveform of the reference waveform data therefor is scaled. If the difference between the reference waveform data for the first and second candidate characters is smaller after scaling than before scaling, it is determined that the waveforms will be similar.

Whether the first and second candidate characters are characters with waveforms that will resemble each other if the waveforms of the reference waveform data are scaled is determined here based on the result of the sliding comparison in the first recognition phase and third recognition phase. More specifically, if the candidate characters are determined in either the first recognition phase or the third recognition phase to be characters with waveforms that will be similar if the waveforms are scaled, that decision is used.

If the first and second candidate characters are characters with waveforms that will resemble each other if the waveforms of the reference waveform data are scaled (step SA10 returns YES), the character recognition unit 80 goes to step SA11. If the first and second candidate characters are not characters with waveforms that will resemble each other if the waveforms of the reference waveform data are scaled (step SA10 returns NO), the character recognition unit 80 goes to the fourth recognition phase in step SA12.

Step SA11 is the same as step SA5. In step SA11 the character recognition unit 80 determines if the difference B between the reference waveform data of the second candidate character and the character waveform data of the target character is greater than or equal to 1.25 times the difference A between the reference waveform data of the first candidate character and the character waveform data.

If difference B is greater than or equal to 1.25 times difference A (step SA11 returns YES), the character recognition unit 80 goes to the fourth recognition phase in step SA12. If difference B is less than 1.25 times difference A (step SA11 returns NO), the character recognition unit 80 skips the fourth recognition phase and goes to the fifth recognition phase in step SA14.

The fourth recognition phase in step SA12 uses the reference waveform data for laser printing, the operation is the same as in the second recognition phase of step SA6, and further description thereof is thus omitted.

In the next step SA13, the character recognition unit 80 determines if the target character was recognized in the fourth recognition phase in step SA12. If the target character was recognized (step SA13 returns YES), the character recognition unit 80 skips the fifth recognition phase and goes directly to step SA19. If the target character was not recognized (step SA13 returns NO), the character recognition unit 80 executes the fifth recognition phase in step SA14.

Instead of comparing all sampling units, the fifth recognition phase in step SA14 compares the waveform of the target character waveform data and the waveform of the reference waveform data at the positions of the peaks and the sampling units there before and after in the reference waveform data. This eliminates the effect of distortion of the waveform of the character waveform data of the target character, and enables recognizing the target character with consideration for stretching, compression, and shifting in parts of the waveform.

The fifth recognition phase does not confirm recognition of the target character as in the other recognition phases, and recognition of the target character is confirmed only if a specific condition is met as described below. Confirmation of target character recognition in the fifth recognition phase is therefore referred to as "provisional confirmation" below. This is because while the other recognition phases recognize magnetic ink characters using the difference in all sampling units, the fifth recognition phase recognizes magnetic ink characters using the results of comparing the waveform of the character waveform data and the waveform of the reference waveform data in specific sampling units.

In the next step SA15, the character recognition unit 80 determines if the target character was provisionally recognized in the fifth recognition phase. If recognition of the target character was not provisionally confirmed (step SA15 returns NO), that is, if the target character could not be recognized in any of the first to fifth recognition phases, the character recognition unit 80 determines that the target character cannot be recognized by magnetic recognition (step SA16), and goes to step SA19.

If recognition of the target character is provisionally confirmed in the fifth recognition phase (step SA15 returns YES), the character recognition unit 80 determines if there is a match between the character provisionally recognized in the fifth recognition phase and the character used as the first or second candidate character in the preceding recognition phases (step SA17). Whether there is a match between the character provisionally recognized in the fifth recognition phase and either the first or second candidate character in the second recognition phase is determined in this example.

If the characters do not match (step SA17 returns NO), the character recognition unit 80 determines that the target character cannot be recognized by magnetic recognition (step SA16), and goes to step SA19. If there is a match (step SA17 returns YES), the character recognition unit 80 confirms that the target character is the character that was provisionally recognized in the fifth recognition phase (step SA18), and goes to step SA19.

In step SA19, the character recognition unit 80 determines if the magnetic recognition process was completed, that is, if all magnetic ink characters 101 in the MICR line 100 were processed as the target character. If the magnetic recognition process was completed (step SA19 returns YES), the character recognition unit 80 goes to step SA20 in FIG. 9. If the magnetic recognition process is not completed (step SA19 returns NO), the character recognition unit 80 returns to step SA1 and magnetically recognizes the next target character.

In step SA20 in FIG. 9, the character recognition unit 80 detects the number of characters in the recognition string. In step SA21, the character recognition unit 80 determines if all characters contained in the recognition string, that is, all magnetic ink characters 101 in the MICR line 100, were recognized.

If all characters were recognized (step SA21 returns YES), the host-side control unit 73 determines that reading the MICR line 100 was successful and in step SA22 executes the process that is performed when the MICR line 100 is successfully read. The process performed when the MICR line 100 is successfully read includes, for example, storing the information indicated by the MICR line 100 in a storage unit, recording a specific endorsement image on the back of the check 4 with a printer or other recording device, and discharging the check 4 from the check reader 1.

However, if there is even only one character in the recognition string that could not be recognized (step SA21 returns NO), the character recognition unit 80 executes the optical recognition process in step SA23 to optically recognize target characters not recognized by magnetic recognition.

In the optical recognition process of step SA23, the character recognition unit 80 identifies the range of data corresponding to an image of the MICR line 100 in the data for the image of the check 4 front captured by the front contact image sensor 52, and extracts image data for each magnetic ink character 101. The character recognition unit 80 then optically recognizes the characters by comparing bitmap patterns for each of the 14 MICR characters with the extracted image data, and recognizes each of the magnetic ink characters 101.

The optical recognition process in step SA23 may recognize a target character that was not recognized in the magnetic recognition process based on the result of optical recognition, or provisionally recognize the character based on the result of optical recognition and confirm recognition if the provisionally recognized character matches the first candidate and second candidate used in the magnetic recognition process.

In step SA24, the character recognition unit 80 determines if all magnetic ink characters 101 that were not recognized by magnetic recognition were recognized by the optical recognition process in step SA23. If all magnetic ink characters 101 are recognized (step SA24 returns YES), the character recognition unit 80 executes the operation performed in step SA22 when the MICR line 100 is successfully read.

However, if there is even only one magnetic ink character that could not be recognized (step SA24 returns NO), the host-side control unit 73 executes the operation performed in step SA25 when reading the MICR line 100 fails. The operation performed in step SA25 when reading the MICR line 100 fails discharges the check 4 without printing an endorsement image, for example. The discharged check 4 is then examined to determine why reading failed, or is read again, for example.

The character recognition process of the check reader 1 according to this embodiment of the invention ends as described above.

The effect of a recording media processing device, control method of a recording media processing device, and program according to the invention as described above is described below.

(1) Even if the waveforms of the reference waveform data for the first and second candidate characters will be similar to each other if the waveforms are stretched or compressed, the reference waveform data is scaled and adjusted when the ratio of the difference B between the character waveform data and the reference waveform data of the second candidate character to the difference A between the character waveform data and the reference waveform data of the first candidate character is greater than or equal to a specific value (1.25). The magnetic ink character 101 is then recognized based on the difference between the character waveform data and the reference waveform data after being corrected. More specifically, the reference waveform is scaled and adjusted if the difference between difference A of the first candidate and difference B of the second candidate is large and the possibility of erroneously recognizing one candidate for the other is considered low, but the reference waveform is not scaled and adjusted if the difference between difference A of the first candidate and difference B of the second candidate is small and possibility of erroneously recognizing one candidate for the other is considered high. Recognition errors can therefore be reduced and the recognition rate improved when the waveform of the acquired character waveform data is stretched or compressed.

(2) Whether the candidate characters are characters with waveforms that will resemble each other if their waveforms are scaled can be detected by sliding and comparing the reference waveform for the first candidate character and the reference waveform for the second candidate character, and the waveform of the character waveform data. By determining if the candidate characters are similar characters based on this operation, whether the characters have similar waveforms when the waveforms of the reference waveform data are scaled can be desirably determined.

(3) The waveforms of the number 2 and number 5, and the number 4 and transit symbol T, are similar when stretched or compressed, and when the first and second candidate characters are these characters, the characters can be quickly determined to be characters with similar waveforms when the waveforms of the reference waveform data are stretched or compressed.

A preferred embodiment of the invention is described above, but the invention is not limited thereto and can obviously be modified and adapted as desired within the scope of the invention.

For example, the magnetic recognition process has five magnetic recognition phases in the embodiment described above, but the invention is not so limited. The magnetic recognition process does not need to include all magnetic recognition phases, and embodiments having only the first recognition phase and second recognition phase, or only the third recognition phase and fourth recognition phase, are conceivable. The recognition phases can be selectively applied based on the type of magnetic ink or the recognition rate of the magnetic recognition process, for example.

The recording media processing device described in the foregoing embodiment includes a check reader 1 and host computer 70, and the character recognition unit 80 of the host computer 70 executes the character recognition and other processes. A configuration in which the control unit 71 of the check reader 1, however, executes the character recognition and other processes performed by the character recognition unit 80 of the host computer 70 above is also conceivable. In this embodiment, the result of character recognition is sent to the host computer 70. The reference waveform data is also stored in ROM of the control unit 71 of the check reader 1.

The foregoing embodiment includes an optical recognition process, but the invention is not so limited. The optical recognition process may be omitted when a desired recognition rate is achieved in the magnetic recognition phase.

The functions of parts of the check reader 1 and the control method of the check reader 1 described in the foregoing embodiment can also be achieved by storing all or part of the foregoing program on a hard disk, optical disc, magneto-optical disc, floppy disk, Compact Disc, flash ROM, ROM, or other storage medium, or installing the program as a driver on the host computer 70, and the host-side control unit 73 of the host computer 70 or the control unit 71 of the check reader 1 reading and executing the program, for example.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A recording media processing device comprising:
a magnetic reading unit that magnetically reads a magnetic ink character recorded on a recording medium; and
a character recognition unit that recognizes the read magnetic ink character based on comparing character waveform data acquired by the magnetic reading unit reading the magnetic ink character with reference waveform data for magnetic ink characters,
the character recognition unit calculating a difference between the character waveform data and the reference waveform data for each magnetic ink character, defining a first one of the character characters with the smallest difference as a the first candidate character of the read magnetic ink character, and defining a second one of the character characters with the next-smallest difference as a the second candidate character of the read magnetic ink character, and scaling and adjusting the waveform of the reference waveform data for the first candidate character and the waveform of reference waveform data for the second candidate character, and recognizing the read magnetic ink character based on the difference between the reference waveform data of the adjusted candidate characters and the character waveform data,
wherein the scaling is performed when the first candidate character is one of the number 2 and number 5 and the second candidate character is another of the number 2 and number 5, or the first candidate character is one of the number 4 and the transit symbol T and the second candidate character is another of the number 4 and transit symbol T, and
when the ratio of the difference between the reference waveform data of the second candidate character and the character waveform data, to the difference between the reference waveform data of the first candidate character and the character waveform data, is greater than or equal to a specific value.

2. The recording media processing device described in claim 1, wherein: based the result of sliding and comparing the reference waveform data for the first candidate character, the reference waveform data for the second candidate character, and the waveform of the character waveform data,
the character recognition unit determines whether the first candidate character and the second candidate character are a character set with waveforms that will resemble each other and have a smaller difference therebetween when the waveforms of the reference waveform data are scaled than before the waveforms of the reference waveform data are scaled.

3. A control method of a recording media processing device having a magnetic reading unit that magnetically reads a magnetic ink character recorded on a recording medium, and a character recognition unit that recognizes the read magnetic ink character based on comparing character waveform data acquired by the magnetic reading unit reading the magnetic ink character with reference waveform data for magnetic ink characters, the control method comprising steps of:

calculating a difference between the character waveform data and the reference waveform data for each magnetic ink character, defining a first one of the character characters with the smallest difference as a the first candidate character of the read magnetic ink character, and defining a second one of the character characters with the next-smallest difference as a the second candidate character of the read magnetic ink character; and
scaling and adjusting the waveform of the reference waveform data for the first candidate character and the waveform of reference waveform data for the second candidate character, and recognizing the read magnetic ink character based on the difference between the reference waveform data of the adjusted candidate characters and the character waveform data,
wherein the scaling is performed when the first candidate character is one of the number 2 and number 5 and the second candidate character is another of the number 2 and number 5, or the first candidate character is one of the number 4 and the transit symbol T and the second candidate character is another of the number 4 and transit symbol T, and
when the ratio of the difference between the reference waveform data of the second candidate character and the character waveform data, to the difference between the reference waveform data of the first candidate character and the character waveform data, is greater than or equal to a specific value.

4. The control method of a recording media processing device described in claim 3, wherein: the step of recognizing the read magnetic ink character determines, based the result of sliding and comparing the reference waveform data for the first candidate character, the reference waveform data for the second candidate character, and the waveform of the character waveform data, whether the first candidate character and the second candidate character are a character set with waveforms that will resemble each other and have a smaller difference therebetween when the waveforms of the reference waveform data are scaled than before the waveforms of the reference waveform data are scaled.

5. A non-transitory storage medium storing a program executed by a control unit that controls parts of a recording media processing device having a magnetic reading unit that magnetically reads a magnetic ink character recorded on a recording medium, and a character recognition unit that recognizes the read magnetic ink character based on comparing character waveform data acquired by the magnetic reading unit reading the magnetic ink character with reference waveform data for magnetic ink characters, the program comprising steps of: calculating a difference between the character waveform data and the reference waveform data for each magnetic ink character, defining a first one of the character characters with the smallest difference as a the first candidate character of the read magnetic ink character, and defining a second one of the character characters with the next-smallest difference as a the second candidate character of the read magnetic ink character; and
scaling and adjusting the waveform of the reference waveform data for the first candidate character and the waveform of reference waveform data for the second candidate character, and recognizing the read magnetic ink character based on the difference between the reference waveform data of the adjusted candidate characters and the character waveform data,
wherein the scaling is performed when the first candidate character is one of the number 2 and number 5 and the second candidate character is another of the number 2 and number 5, or the first candidate character is one of the number 4 and the transit symbol T and the second candidate character is another of the number 4 and transit symbol T when the ratio of the difference between the reference waveform data of the second candidate character and the character waveform data, to the difference between the reference waveform data of the first candidate character and the character waveform data, is greater than or equal to a specific value.

6. The non-transitory storage medium storing a program described in claim 5, wherein: the step of recognizing the read magnetic ink character determines, based the result of sliding and comparing the reference waveform data for the first candidate character, the reference waveform data for the second candidate character, and the waveform of the character waveform data, whether the first candidate character and the second candidate character are a character set with waveforms that will resemble each other and have a smaller difference therebetween when the waveforms of the reference waveform data are scaled than before the waveforms of the reference waveform data are scaled.

7. A recording media processing device comprising: a magnetic reading unit that magnetically reads a magnetic ink character recorded on a recording medium; and a character recognition unit that recognizes the read magnetic ink character based on comparing character waveform data acquired by the magnetic reading unit reading the magnetic ink character with reference waveform data for magnetic ink characters, the character recognition unit calculating a difference between the character waveform data and the reference waveform data for each magnetic ink character, defining a first one of the characters with the smallest difference as a first candidate character of the read magnetic ink character, and defining a second one of the characters with the next-smallest difference as a second candidate character of the read magnetic ink character, and scaling and adjusting the waveform of the reference waveform data for the first candidate character and the waveform of reference waveform data for the second candidate character, and recognizing the read magnetic ink character based on the difference between the reference waveform data of the adjusted candidate characters and the character waveform data, wherein the scaling is perform when the first candidate character is one of the number 2 and number 5 and the second candidate character is another of the number 2 and number 5, or the first candidate character is one of the number 4 and transit symbol T and the second candidate character is another of the number 4 and transit symbol T, and when a ratio of the difference between the reference waveform data of the second candidate character and the character waveform data, to the difference between the reference waveform data of the first candidate character and the character waveform data, is greater than or equal to a specific value.

* * * * *